(12) United States Patent
Wang et al.

(10) Patent No.: US 8,865,272 B2
(45) Date of Patent: Oct. 21, 2014

(54) LIQUID CRYSTAL DISPLAYS

(71) Applicant: Industrial Technology Research Institute, Hsinchu (TW)

(72) Inventors: Yi-Rong Wang, Taipei (TW); Chih-Lung Chin, Hsinchu (TW); Wan-Chi Chen, Sinwu Township, Taoyuan County (TW); Kung-Lung Cheng, Hsinchu (TW); Shih-Hsien Liu, Jhubei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 13/887,910

(22) Filed: May 6, 2013

(65) Prior Publication Data

US 2014/0160420 A1    Jun. 12, 2014

(30) Foreign Application Priority Data

Dec. 12, 2012 (TW) ............................... 101146805 A

(51) Int. Cl.
  C09K 19/00 (2006.01)
  C09K 19/02 (2006.01)
  C09K 19/52 (2006.01)
  C09K 19/06 (2006.01)
  G02F 1/13 (2006.01)

(52) U.S. Cl.
  CPC .................... *G02F 1/1306* (2013.01)
  USPC ........ 428/1.1; 428/1.3; 349/182; 252/299.01; 252/299.6

(58) Field of Classification Search
  USPC ................ 428/1.1, 1.3; 349/182; 252/299.01, 252/299.6
  See application file for complete search history.

(56) References Cited

U.S. PATENT DOCUMENTS

| | | | |
|---|---|---|---|
| 6,589,445 B2 | 7/2003 | Sugiyama et al. | |
| 6,909,478 B2 | 6/2005 | Ichihashi et al. | |
| 7,408,606 B2 | 8/2008 | Shih | |
| 7,452,482 B2 * | 11/2008 | Welter | 252/299.01 |
| 7,470,376 B2 | 12/2008 | Welter et al. | |
| 7,871,539 B2 | 1/2011 | Takaku et al. | |
| 8,007,876 B2 | 8/2011 | Wu et al. | |
| 8,025,938 B2 | 9/2011 | Shukla et al. | |

FOREIGN PATENT DOCUMENTS

TW    I350401    10/2011

OTHER PUBLICATIONS

Bernhard Kohler et al., "Novel Chiral Macrocytes Containing Two Electronically Interacting Arylene Chromophores", Chem. Eur. J. 2001, 7, No. 14, p. 3000-3004.
Oleg Stenzel et al., "Bis(2,4,7-trimethylindenyl)cobalt(II) and rac-2, 2', 4, 4,' 7, 7'-hexamethyl-1, 1'-biindene", Acta Cryst. (2001). C57, p. 1056-1059.
Salvatore Caccamese et al., "Chiral HPLC separation and CD spectra of the enantiomers of a molecular 'hamburger'", Elsevier, Mendeleev Commun, 2004, p. 237-239.
Suman Kumar et al., "Spiro-biindane containing fluorinated poly(ether imide)s: Synthesis characterization and gas separation properties", Elsevier, Journal of Membrane Science, 365(2010), p. 329-340.
Murugapillai Venugopal et al., "Synthesis and resolution of new cyclohexyl fused spirobiindane 7, 7'-diol", Elsevier, Tetrahedron: Asymmetry 15(2004) p. 3427-3431.

* cited by examiner

*Primary Examiner* — Geraldina Visconti
(74) *Attorney, Agent, or Firm* — Muncy, Geissler, Olds & Lowe, P.C.

(57) ABSTRACT

In an embodiment of the present disclosure, a liquid crystal display is provided. The liquid crystal display includes an upper substrate, a lower substrate opposite to the upper substrate, and a liquid crystal layer disposed between the upper substrate and the lower substrate, wherein the liquid crystal layer includes a first chiral compound and a second chiral compound, and the first chiral compound and the second chiral compound are enantiomeric and separated from each other.

5 Claims, 4 Drawing Sheets ns
LIQUID CRYSTAL DISPLAYS

CROSS REFERENCE TO RELATED APPLICATIONS

This Application claims priority of Taiwan Patent Application No. 101146805, filed on Dec. 12, 2012, the entirety of which is incorporated by reference herein.

BACKGROUND

1. Technical Field

The technical field relates to a liquid crystal display.

2. Description of the Related Art

A cholesteric liquid crystal display is a reflective display without backlight, using plastic as a substrate to replace traditional glass substrates, meeting flexible display application requirements such as being light, thin and rugged etc. and being applied to numerous areas such as electronic tags, e-books, smart cards, flat panel displays, large billboards and tablet PCs etc. Due to the display medium having memory characteristics where there is no power consumption for a static screen, the power consumption is tremendously lowered when compared with a traditional liquid crystal display.

In general, a cholesteric liquid crystal is formed by adding chiral dopants in a nematic liquid crystal host, with the characteristics of reflecting left-handed light or right-handed light. When light enters cholesteric liquid crystals with the characteristic of reflecting left-handed light, the left-handed light with the same chirality as the cholesteric liquid crystals will be reflected and the right-handed light with the other chirality will pass through the cholesteric liquid crystals.

In conclusion, the relevant research of cholesteric liquid crystal displays is imperatively called-for.

SUMMARY

One embodiment of the disclosure provides a liquid crystal display, comprising: an upper substrate; a lower substrate opposite to the upper substrate; and a liquid crystal layer disposed between the upper substrate and the lower substrate, wherein the liquid crystal layer comprises a first chiral compound and a second chiral compound, and the first chiral compound and the second chiral compound are enantiomeric and separated from each other.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawing, wherein.

DETAILED DESCRIPTION

Figure 1:
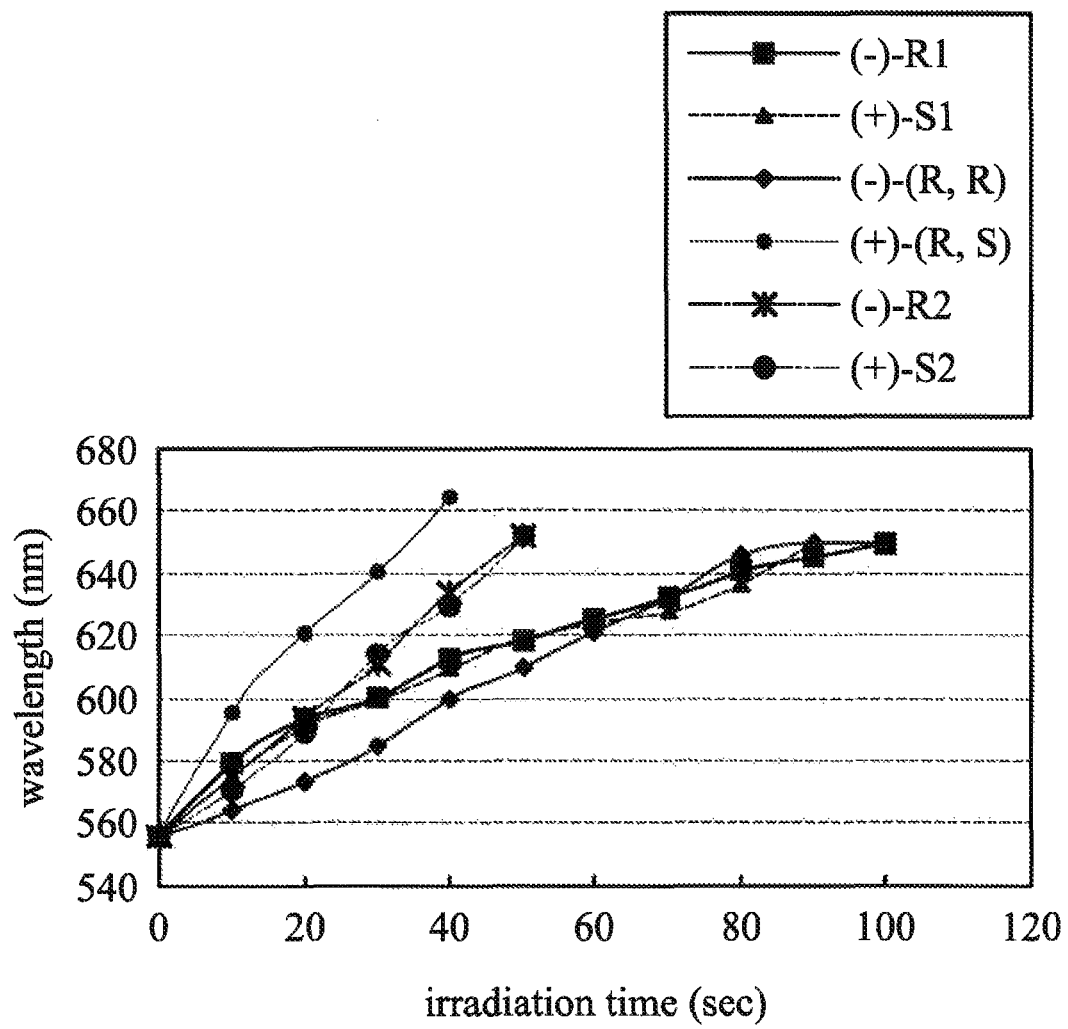
FIG. 1 shows variations of reflection wavelengths of liquid crystal displays (single-layer cholesteric liquid crystal layer) with irradiation time.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a liquid crystal display comprising an upper substrate, a lower substrate opposite to the upper substrate, and a liquid crystal layer disposed between the upper substrate and the lower substrate. The liquid crystal layer comprises a first chiral compound and a second chiral compound. Specifically, the first chiral compound and the second chiral compound are enantiomeric and separated from one another.

In an embodiment, the first chiral compound and the second chiral compound have the following formula:

$$R_1-(D)_p-\!\!\!=\!\!\!-(A)_m-\overset{O}{\underset{\|}{C}}-O-\text{[aryl]}-(Y)_n$$

$$(Y)_n-\text{[aryl]}-O-\overset{O}{\underset{\|}{C}}-(E)_r-W-(Z)_q-R_2$$

In the formula, A may comprise benzene, naphthalene, pyridine, furan, thiophene or a single bond.

D may comprise benzene, naphthalene, pyridine, furan, thiophene or a single bond.

$R_1$ and $R_2$ may, independently, comprise hydrogen, C1-10 alkyl, C1-10 alkoxy, fluoro or trifluoro methyl.

E may comprise benzene, naphthalene, pyridine, furan, thiophene or a single bond.

W may comprise —CO—O—, —O—CO—, —O—, —CH$_2$—CH$_2$—, —CH=CH—, —CH$_2$—O—, —O—CH$_2$— or a single bond.

Z may comprise benzene, naphthalene, pyridine, furan, thiophene or a single bond.

Y may comprise hydrogen, methyl, ethyl or propyl.

m may be 0, 1 or 2, p may be 0, 1 or 2, r may be 0, 1 or 2, q may be 0, 1 or 2, and n may be 0, 1, 2 or 3.

In another embodiment, the first chiral compound and the second chiral compound have the following formula:

$$\text{[binaphthyl]}-O-\overset{O}{\underset{\|}{C}}-(A)_m-Y-(D)_p-R_3$$
$$-O-\overset{O}{\underset{\|}{C}}-(E)_r-W-(Z)_q-R_4$$

In the formula, A may comprise benzene, naphthalene, pyridine, furan, thiophene or a single bond.

Y may comprise —CO—O—, —O—CO—, —O—, —CH$_2$—CH$_2$—, —CH=CH—, —CH$_2$—O—, —O—CH$_2$— or a single bond.

D may comprise benzene, naphthalene, pyridine, furan, thiophene or a single bond.

$R_3$ and $R_4$ may, independently, comprise hydrogen, C1-10 alkyl, C1-10 alkoxy, fluoro or trifluoro methyl.

E may comprise benzene, naphthalene, pyridine, furan, thiophene or a single bond.

W may comprise —CO—O—, —O—CO—, —O—, —CH$_2$—CH$_2$—, —CH═CH—, —CH$_2$—O—, —O—CH$_2$— or a single bond.

Z may comprise benzene, naphthalene, pyridine, furan, thiophene or a single bond.

m may be 0, 1 or 2, p may be 0, 1 or 2, r may be 0, 1 or 2, and q may be 0, 1 or 2.

In an embodiment, the liquid crystal layer comprises a first chiral liquid crystal layer and a second chiral liquid crystal layer, and the first chiral liquid crystal layer is disposed above the second chiral liquid crystal layer. In an embodiment, the first chiral liquid crystal layer comprises the first chiral compound above-mentioned, and the second chiral liquid crystal layer comprises the second chiral compound above-mentioned.

In another embodiment, the first chiral compound and a liquid crystal host are encapsulated by a material to form a plurality of first chiral liquid crystal micelles. The second chiral compound and a liquid crystal host are encapsulated by a material to form a plurality of second chiral liquid crystal micelles. In an embodiment, the first chiral liquid crystal micelles and the second chiral liquid crystal micelles are divided into two layers. In another embodiment, the first chiral liquid crystal micelles and the second chiral liquid crystal micelles are mixed with one another. The material encapsulating the first chiral compound and the second chiral compound may comprise gelatin, polyurethane, polyvinyl alcohol, epoxy resin or acrylic resin.

In an embodiment, the method for fabricating chiral liquid crystal micelles comprises the following steps. A liquid crystal host and a chiral dopant (e.g., the first or second chiral compound) are mixed into a water-soluble gelatin to form a mixture containing the first or second chiral liquid crystal micelles with diameters of about 8-10 μm which are uniformly dispersed therein. After the mixture containing the first or second chiral liquid crystal micelles is coated on a substrate and dried, a liquid crystal layer is prepared. In another embodiment, the first chiral liquid crystal micelles and the second chiral liquid crystal micelles are mixed with one another and uniformly dispersed in a liquid crystal layer.

In the disclosure, the first chiral compound and the second chiral compound with different chiralities used as chiral dopants for adding in a liquid crystal host are enantiomeric. In an embodiment, a cholesteric liquid crystal layer containing the first chiral compound is stacked on another cholesteric liquid crystal layer containing the second chiral compound and illuminated (light source such as ultraviolet light) to fabricate pixels. The problem of color shift caused by illuminating the stacked cholesteric liquid crystal layers with different chiralities can thus be resolved.

Example 1

Variations of Reflection Wavelengths of Liquid Crystal Displays (Single-Layer Cholesteric Liquid Crystal Layer) with Irradiation Time First, six chiral compounds (such as (−)-R1, (+)-S1, (−)-(R,R), (+)-(R,S), (−)-R2, (+)-S2) used as chiral dopants were respectively added to a nematic liquid crystal host (IBL-087, Merck Corp.) to prepare cholesteric liquid crystals. The reflection wavelengths of the cholesteric liquid crystals were adjusted to 555 nm (green). Next, the prepared cholesteric liquid crystal was disposed between two transparent substrates to form a single-layer cholesteric liquid crystal layer. The reflection wavelength of the single-layer cholesteric liquid crystal layer was measured using a UV/Visible spectrometer (JASCO V-550). Each UV illumination (wavelength: 365 nm, power: 4 mW/cm$^2$) was performed for an interval of 10 seconds. After each UV illumination, the reflection wavelength of the cholesteric liquid crystal layer was measured until the reflection wavelength thereof was larger than 650 nm (e.g., converted to red). The results are shown in FIG. 1. FIG. 1 shows variations of reflection wavelengths of liquid crystal displays (single-layer cholesteric liquid crystal layer) with irradiation time. The structures of the chiral compounds (such as (−)-R1, (+)-S1, (−)-(R,R), (+)-(R,S), (−)-R2, (+)-S2) are shown in Table 1.

TABLE 1

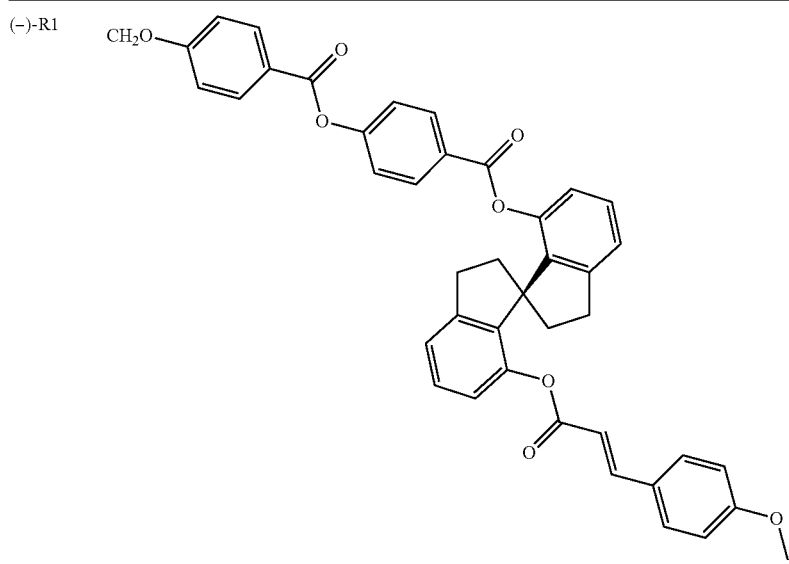

(−)-R1

TABLE 1-continued
(+)-S1
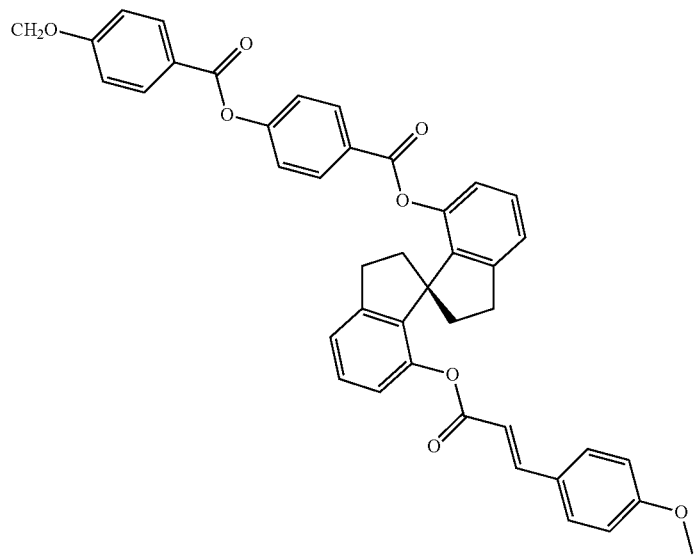
(−)-(R,R)
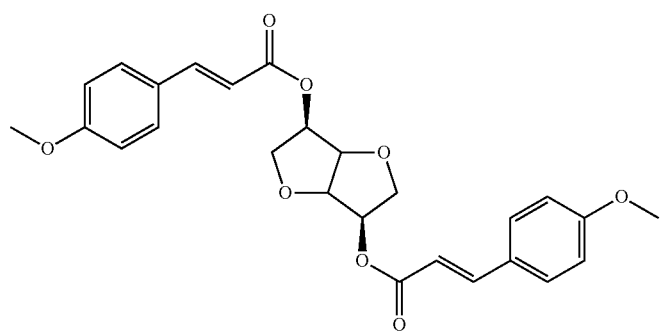
(+)-(R,S)
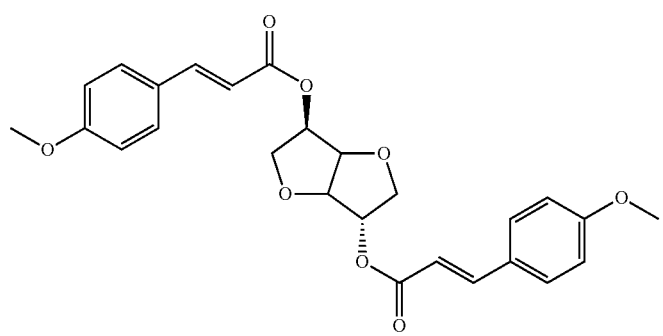
(−)-R2
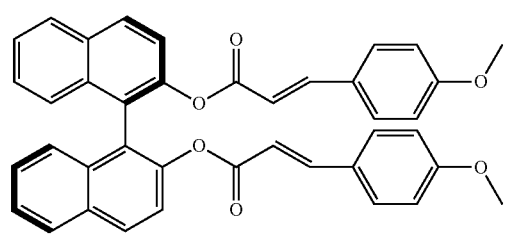

TABLE 1-continued (+)-S2

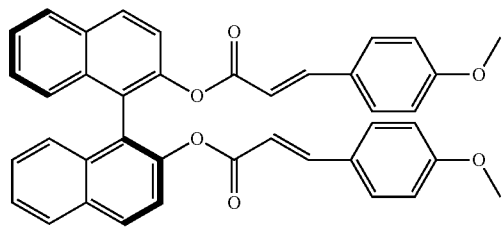

Example 2

Variations of Reflection Wavelengths of Liquid Crystal Displays (Dual-Layer Cholesteric Liquid Crystal Layer) with Irradiation Time First, six chiral compounds (such as (−)-R1, (+)-S1, (−)-(R,R), (+)-(R,S), (−)-R2, (+)-S2) used as chiral dopants were respectively added to a nematic liquid crystal host (IBL-087, Merck Corp.) to prepare cholesteric liquid crystals. The reflection wavelengths of the cholesteric liquid crystals were adjusted to 555 nm (green). Next, the cholesteric liquid crystal layers containing chiral dopants with various chiralities were stacked (such as (+R1/(+)-S1 stack, (−)-(R,R)/(+)-(R,S) stack, and (−)-R2/(+)-S2 stack) to form a dual-layer cholesteric liquid crystal layer disposed between two transparent substrates. The reflection wavelength of the dual-layer cholesteric liquid crystal layer was measured using a UV/Visible spectrometer (JASCO V-550). Each UV illumination (wavelength: 365 nm, power: 4 mW/cm$^2$) was performed for an interval of 30 seconds. After each UV illumination, the reflection wavelength of the cholesteric liquid crystal layer was measured until the reflection wavelength of one of the dual-layer cholesteric liquid crystal layers was larger than 650 nm (e.g., converted to red). In each dual-layer cholesteric liquid crystal layer, an isolation board (a glass isolation board was used herein) was disposed between the cholesteric liquid crystal layers containing chiral dopants with various chiralities. Finally, the reflection wavelength of each cholesteric liquid crystal layer was measured. The results are shown in Table 2. Table 2 shows variations of reflection wavelengths of liquid crystal displays (dual-layer cholesteric liquid crystal layer) with irradiation time.

TABLE 2

|  | Initial wavelength (nm) | Irradiation time (sec) | Final wavelength (nm) | Irradiation time (sec) | Final wavelength (nm) |
| --- | --- | --- | --- | --- | --- |
| (−)-R1 | 555 | 90 | 590 | 240 | 657 |
| (+)-S1 | 555 | 90 | 590 | 240 | 655 |
| (−)-(R,R) | 555 | 90 | 584 |  |  |
| (+)-(R,S) | 555 | 90 | 703 |  |  |
| (−)-R2 | 555 | 90 | 586 | 180 | 652 |
| (+)-S2 | 555 | 90 | 587 | 180 | 654 |

In accordance with Table 2, after the stacked cholesteric liquid crystal layer with left-handed and right-handed chiralities (such as (−)-R1 and (+)-S1; (−)-R2 and (+)-S2) of the present disclosure was illuminated, the variation of the reflection wavelength between the cholesteric liquid crystal layers with left-handed and right-handed chiralities was quite small (less than 10 nm). The results can prove that there was almost no color shift between the cholesteric liquid crystal layers stacked by enantiomers of the present disclosure. However, the molecule with (−)-(R,R) and the molecule with (+)-(R,S) were diastereomers rather than enantiomers as required by the present disclosure such that the variation of the reflection wavelength between the cholesteric liquid crystal layers was huge (larger than 100 nm), resulting in serious color shift.

Example 3

Figure 2:
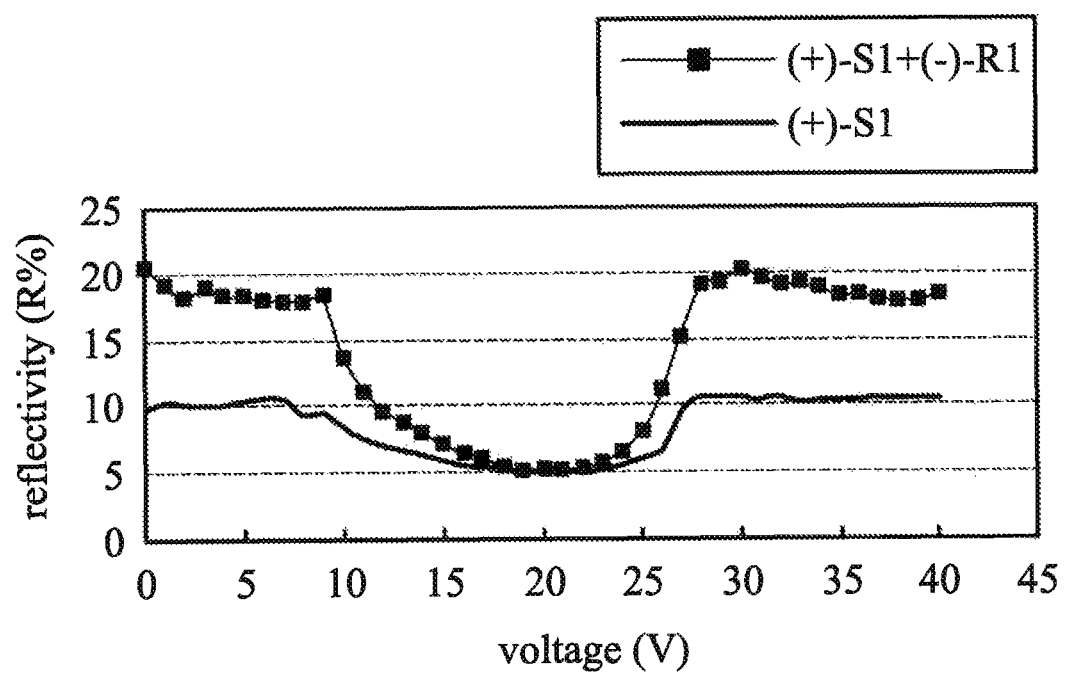
FIG. 2 shows variations of reflectivity of liquid crystal displays (single-/dual-layer cholesteric liquid crystal layer) with voltage.
Figure 3:
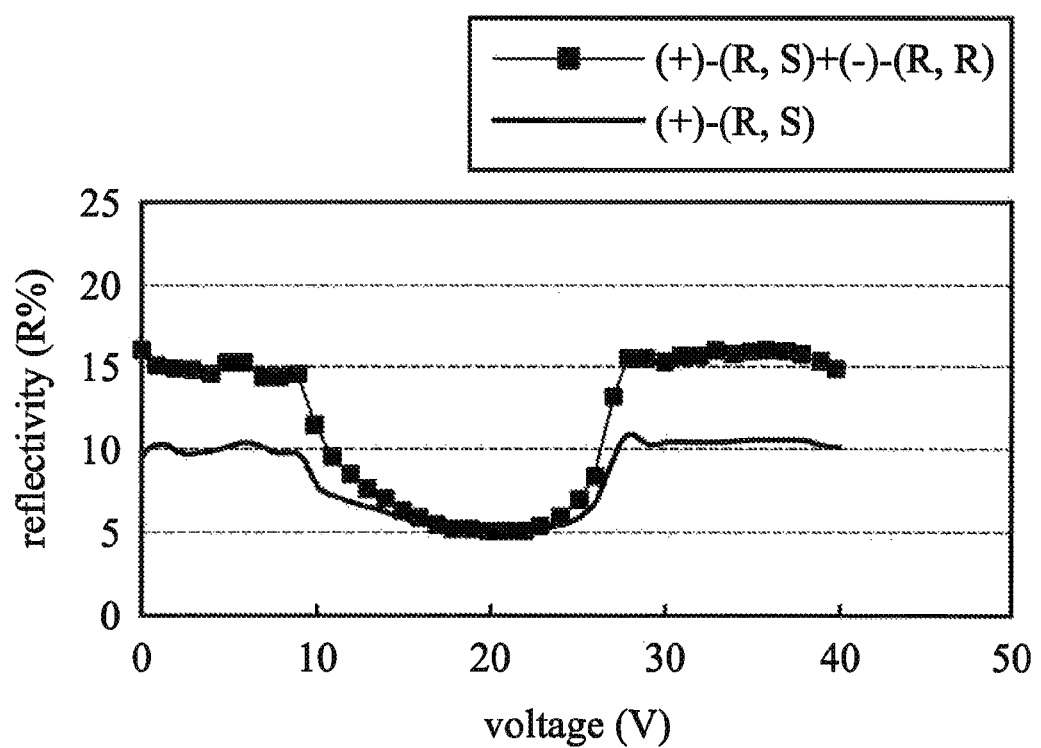
FIG. 3 shows variations of reflectivity of liquid crystal displays (single-/dual-layer cholesteric liquid crystal layer) with voltage.
Figure 4:
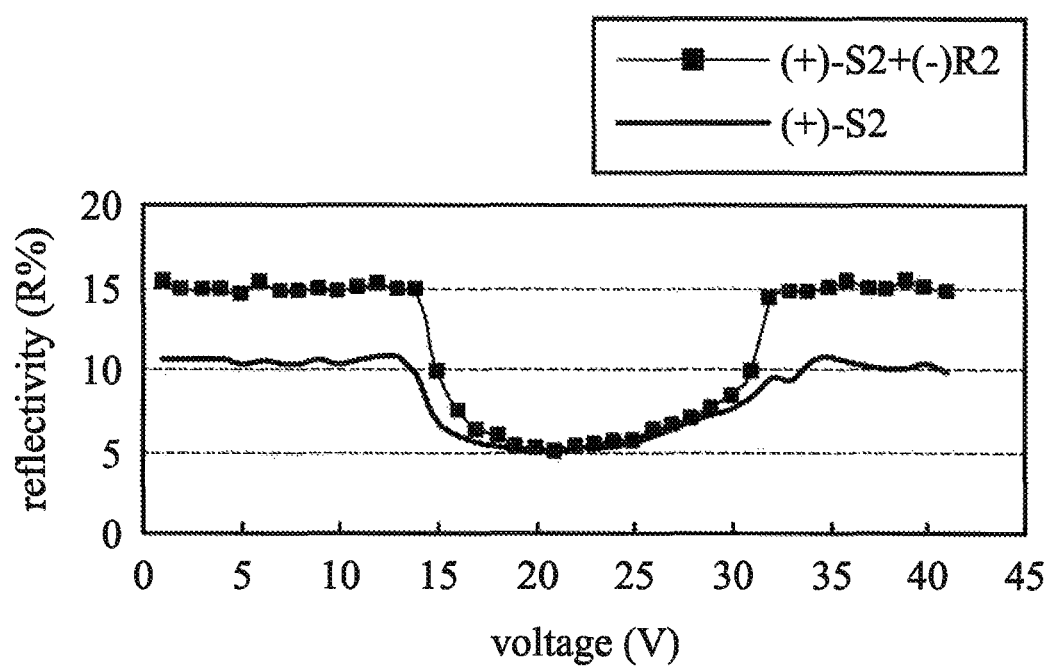
FIG. 4 shows variations of reflectivity of liquid crystal displays (single-/dual-layer cholesteric liquid crystal layer) with voltage.

Variations of Reflectivity of Liquid Crystal Displays (Single-/Dual-Layer Cholesteric Liquid Crystal Layer) with Voltage First, variations of reflectivity of a single-layer cholesteric liquid crystal layer (such as (+)-S1, (+)-(R,S) and (+)-S2) with voltage were measured using an Autronics DMS-803. Cholesteric liquid crystals were injected into a liquid crystal cell to form a cholesteric liquid crystal layer. The cholesteric liquid crystal layer was illuminated using a full-wavelength light source. After applying a voltage, the voltage-corresponding reflectivity of the cholesteric liquid crystal layer was measured. Next, variations of reflectivity of a stacked dual-layer cholesteric liquid crystal layer with various chiralities (such as (−)-R1/(+)-S1 stack, (−)-(R,R)/(+)-(R,S) stack and (−)-R2/(+)-S2 stack) with voltage were measured using an Autronics DMS-803. The results are shown in FIGS. 2-4. FIGS. 2-4 shows variations of reflectivity of liquid crystal displays (single-/dual-layer cholesteric liquid crystal layer) with voltage.

In accordance with FIGS. 2-4, in this example, compared to the single-layer cholesteric liquid crystal layer ((+)-S1), the reflectivity of the stacked dual-layer cholesteric liquid crystal layer ((−)-R1/(+)-S1 stack) was improved to about 1.7 times. However, compared to the single-layer cholesteric liquid crystal layer ((+)-(R,S)), the reflectivity of the dual-layer cholesteric liquid crystal layer stacked by the molecule with (−)-(R,R) and the molecule with (+)-(R,S) was merely increased to about 1.5 times. In this example, the cholesteric liquid crystal layer stacked by enantiomers is suitable for use in cholesteric liquid crystal displays, improving the reflectivity thereof.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A liquid crystal display, comprising:
   an upper substrate;
   a lower substrate opposite to the upper substrate; and
   a liquid crystal layer disposed between the upper substrate and the lower substrate, wherein the liquid crystal layer comprises a first chiral compound and a second chiral compound, and the first chiral compound and the second chiral compound are enantiomeric, wherein the first chiral compound and the second chiral compound are respectively encapsulated by a material to form to plurality of first chiral liquid crystal micelles and a plurality of second chiral liquid crystal micelles or an isolation board is disposed between the first chiral compound and the second chiral compound such that the first chiral compound and the second chiral compound are separated from each other, wherein the first chiral compound and the second chiral compound have the following formula:

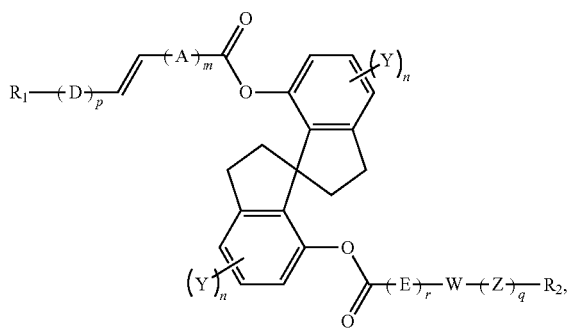

wherein A is benzene, naphthalene, pyridine, furan, thiophene or a single bond, D is benzene, naphthalene, pyridine, furan, thiophene or a single bond, $R_1$ and $R_2$ are, independently, hydrogen, C1-10 alkyl, C1-10 alkoxy, fluoro or trifluoro methyl, E is benzene, naphthalene, pyridine, furan, thiophene or a single bond, W is —CO—O—, —O—CO—, —O—, —CH$_2$—CH$_2$—, —CH$_2$—O—, —O—CH$_2$— or a single bond, Z is benzene, naphthalene, pyridine, furan, thiophene or a single bond, Y is hydrogen, methyl, ethyl or propyl, m is 0, 1 or 2, p is 0, 1 or 2, r is 0, 1 or 2, q is 0, 1 or 2, and n is 0, 1, 2 or 3, or

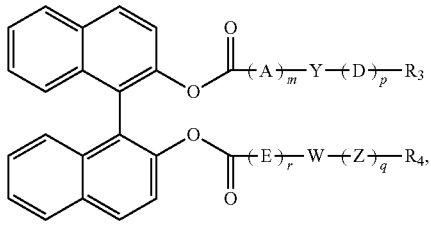

wherein A is benzene, naphthalene, pyridine, furan, thiophene or a single bond, Y is —CO—O—, —O—CO—, —O—, —CH$_2$—CH$_2$—, —CH=CH—, —CH$_2$—O—, —O—CH$_2$— or a single bond, D is benzene, naphthalene, pyridine, furan, thiophene or a single bond, $R_3$ and $R_4$ are, independently, hydrogen, C1-10 alkyl, C1-10 alkoxy, fluoro or trifluoro methyl, E is benzene, naphthalene, pyridine, furan, thiophene or a single bond, W is —CO—O—, —O—CO—, —O—, —CH$_2$—CH$_2$—, —CH=CH—, —CH$_2$—O—, —O—CH$_2$— a single bond, Z is benzene, naphthalene, pyridine, furan, thiophene or a single bond, m is 0, 1 or 2, p is 0, 1 or 2, r is 0, 1 or 2, and q is 0, 1 or 2.

2. The liquid crystal display as claimed in claim 1, wherein the liquid crystal layer comprises a first chiral liquid crystal layer and a second chiral liquid crystal layer, wherein the first chiral liquid crystal layer is disposed above the second chiral liquid crystal layer.

3. The liquid crystal display as claimed in claim 2, wherein the first chiral liquid crystal layer comprises the first chiral compound, and the second chiral liquid crystal layer comprises the second chiral compound.

4. The liquid crystal display as claimed in claim 1, wherein the liquid crystal layer comprises a plurality of first chiral liquid crystal micelles containing the first chiral compound and a plurality of second chiral liquid crystal micelles containing the second chiral compound.

5. The liquid crystal display as claimed in claim 4, wherein the first chiral liquid crystal micelles containing the first chiral compound are disposed above the second chiral liquid crystal micelles containing the second chiral compound.

* * * * *